May 10, 1966 J. DE LIGT 3,250,402
SAFETY BRAKE
Filed March 17, 1964 7 Sheets-Sheet 1

FIG. 1

INVENTOR.
JOHN DeLIGT
BY *M.W. Goodwin*
ATTORNEY

May 10, 1966 J. DE LIGT 3,250,402
SAFETY BRAKE

Filed March 17, 1964 7 Sheets-Sheet 2

INVENTOR.
JOHN DeLIGT
BY M W Goodwin
ATTORNEY

May 10, 1966     J. DE LIGT     3,250,402

SAFETY BRAKE

Filed March 17, 1964     7 Sheets-Sheet 3

FIG. 3

INVENTOR.
JOHN DeLIGT
BY M W Goodwin

ATTORNEY

May 10, 1966  J. DE LIGT  3,250,402
SAFETY BRAKE

Filed March 17, 1964  7 Sheets-Sheet 4

FIG. 4

INVENTOR.
JOHN DeLIGT
BY M W Goodwin
ATTORNEY

May 10, 1966 J. DE LIGT 3,250,402
SAFETY BRAKE
Filed March 17, 1964 7 Sheets-Sheet 5

INVENTOR.
JOHN DeLIGT
BY *M W Jordwin*

ATTORNEY

United States Patent Office 3,250,402
Patented May 10, 1966

3,250,402
SAFETY BRAKE
John De Ligt, Muskegon, Mich., assignor, by mesne assignments, to Dresser Industries, Inc., Dallas, Tex., a corporation of Delaware
Filed Mar. 17, 1964, Ser. No. 352,536
10 Claims. (Cl. 212—128)

This invention relates to novel and improved means for preventing injury to an operator of an overhead material handling device when the operator's cab is mounted for vertical movement and is particularly adapted for use in connection with stacker cranes wherein the operator's cab is mounted for movement with the material supporting assembly of the stacker crane over all or a part of the vertical movement of the material supporting assembly.

A stacker crane of known construction comprises a bridge assembly mounted for movement longitudinally of and on a pair of parallel rails or other supporting means. A depending mast assembly is supported by the bridge and may either be fixed thereto or mounted for rotational movement about the longitudinal axis of the mast. The mast may comprise a single elongated member along which, for example, a fork assembly travels vertically, or the mast assembly may comprise a plurality of telescoping members with the fork assembly being carried by or supported on the lowermost of the telescoping members. It is more or less conventional to provide an operator's cab for movement with the fork assembly over at least a portion of the vertical travel of the fork assembly. More particularly, the cab may be mounted in fixed relation vertically relative to the fork assembly, or it may be carried by an intermediate one of a plurality of telescoping mast members, whereby the cab is movable with the fork assembly over only a portion of the total vertical movement of the forks. An exemplary crane of the last mentioned construction will be described more fully hereinafter.

The fork assembly is conventionally lifted by flexible means such as a cable dead ended on a cable drum supported on the bridge assembly and reeved through pulleys on the fork assembly and pulleys supported by the bridge assembly, whereby rotation of the drum will effect lifting of the fork assembly and controlled release of the drum will permit the fork assembly to lower under the effects of gravity. In most stacker cranes the operator's cab is in one way or another drivingly engaged by the fork assembly over at least a portion of the vertical travel of the fork assembly. Accordingly, if during such portion of the vertical travel of the fork assembly, the lifting cable should fail, and unless means are provided to prevent it, the cab will drop, conceivably causing serious injury to the crane operator.

Accordingly, it is the primary object of this invention to provide novel and improved means to prevent dropping of the operator's cab of a stacker crane or the like in the event that the drive means for effecting lifting of the cab fails or otherwise becomes ineffective to support the cab.

It is a further object of this invention to provide novel and improved means as last described which will be effective without causing any damage to the crane structure.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
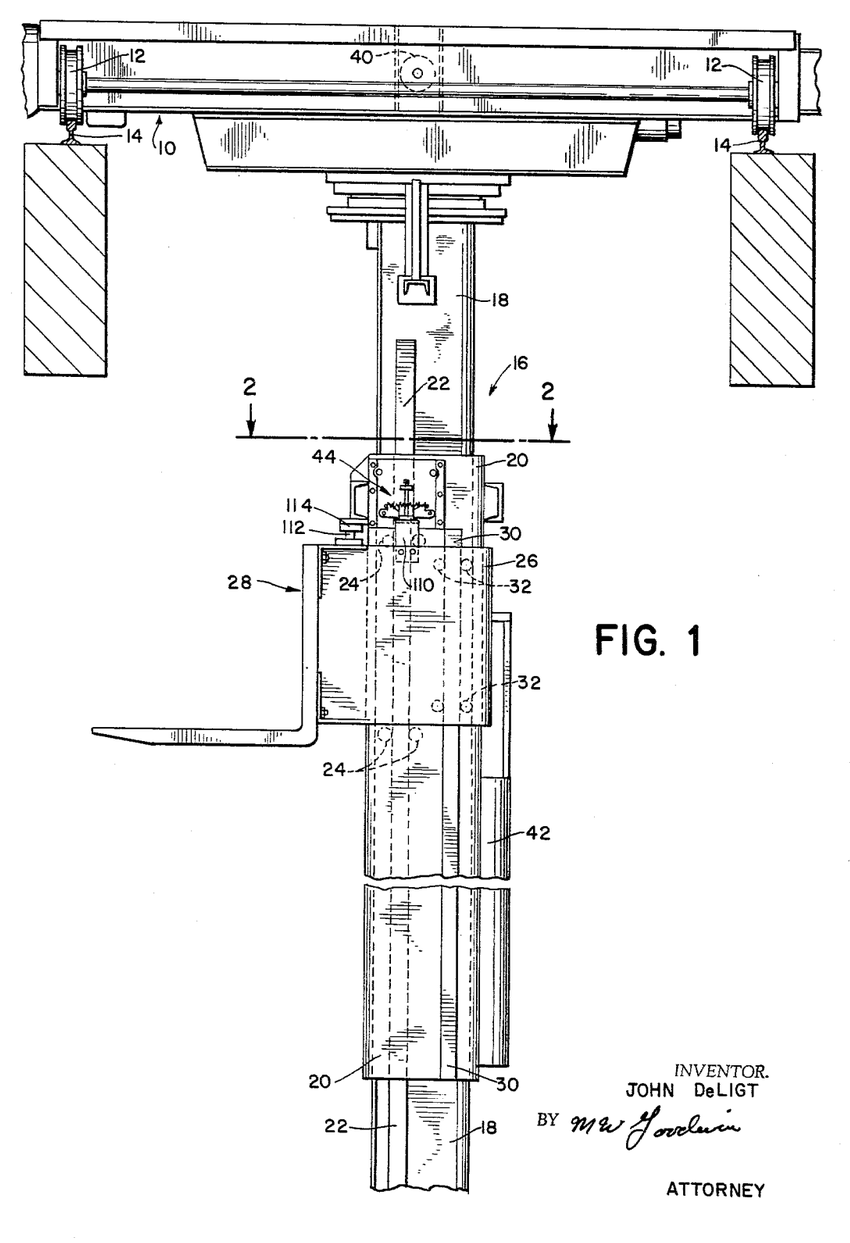
FIG. 1 is an elevational view of an exemplary stacker crane incorporating the present invention.
Figure 2:
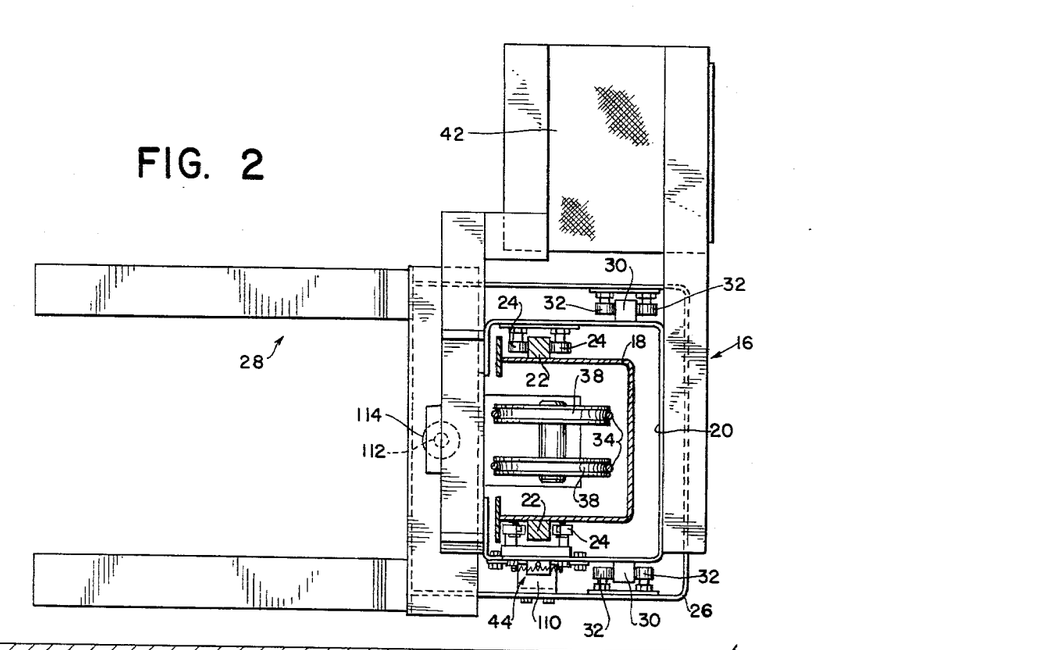
FIG. 2 is a cross-sectional view substantially along the line 2—2 of FIG. 1.

With reference to the drawings, and particularly FIGS. 1 and 2, there is therein shown a stacker crane of a type with which this invention is adapted for use. The crane comprises a bridge assembly generally indicated at 10. The bridge assembly comprises a plurality of wheels 12 which ride along a pair of parallel rails 14 which are suitably supported on walls or the like of the facility of which the crane serves. Depending from the carriage is a mast assembly generally indicated at 16. The mast assembly comprises a fixed mast section 18 which is dependingly supported from the bridge 10 and is fixed vertically relative to the bridge. Telescopically arranged over the fixed mast 18 is an intermediate mast section 20. The intermediate mast section is guided for movement along the fixed mast section by means of an elongated rail 22 extending longitudinally along each side of and fixed relative to the fixed mast 18. A plurality of rollers 24 carried by the intermediate mast section are engaged with opposite sides of each of the rails 22. Telescopically arranged over the intermediate mast section 20 is a short mast portion or section 26 forming a part of a fork assembly generally indicated at 28. The mast section 26, and thus the fork assembly, is guided longitudinally of the intermediate mast section by a pair of rails 30 on opposite sides of the intermediate mast section and extending longitudinally thereof and a plurality of rollers 32 carried by the fork assembly and engaging opposite sides of the guide bar or rail 30.

The fork assembly is supported vertically by a cable 34 dead ended on a cable drum (not shown) supported on the bridge assembly and driven by a suitable motor or the like. The cable 34 is reeved around pulleys such as at 38 on the fork assembly and a pulley 40 having an axis of rotation fixed relative to the cable drum 36. Accordingly, as the drum is rotated the fork assembly will be lifted. Under controlled release of the cable drum the fork assembly will lower under the effects of gravity. In FIG. 1 the fork assembly is shown in a partially lifted condition wherein it is disposed generally alongside an operator's cab 42. In this position of the cab, the operator will be substantially at eye level with the load carried by the fork assembly 28. Cab 42 is for housing the operator of the crane and contains the operating controls for the crane whereby the bridge may be traversed longitudinally of the rails 14, and the fork assembly may be raised and lowered. The intermediate mast section 20 is shown in a partially raised position. The lifting of the mast 20 is accomplished by means of engagement between a lifting lug on the upper end portion of the intermediate mast section and cooperating means on the upper end of the mast section 26 of the fork assembly in a manner known to those skilled in the art. The cab 42 is suitably supported on the intermediate mast 20 for movement therewith. Accordingly, it will be apparent that the cable supporting the fork assembly will also support the intermediate mast section and cab in the lifted condition thereof. It will further be observed that the intermediate mast section projects downwardly beyond the fork assembly 28. In the fully lowered position of the components the upper end of the intermediate mast section will be supported on a stop block fixed to the lower end portion of the fixed mast section 16, in a manner known to those skilled in the art, wherein the lower end of the intermediate mast will be spaced slightly above the floor of the facility served by the crane. The fork assembly will, in the fully lowered position of the crane components, be located substantially at floor level or, in other words, at the lower end of the intermediate mast section. In the lowered condition of the fork assembly, the cab will thus be spaced vertically upwardly therefrom and will be carried by and supported on the fixed mast 18.

In any raised position of the fork assembly in which the fork assembly is carrying the intermediate mast section of the cab, if the cable 34 should break, the fork assembly would, of course, drop and the cab along with it. In order to prevent such a dropping of the cab and consequent injury to the operator of the crane, a safety brake means generally indicated at 44 is carried by the intermediate mast section 20 and provides braking engagement with the guide bar 22 to bring the intermediate mast assembly to a halt and lock it to the fixed mast section in the event of breaking or failure in any portion of the lifting mechanism which would cause the cab to fall.

Figure 3:
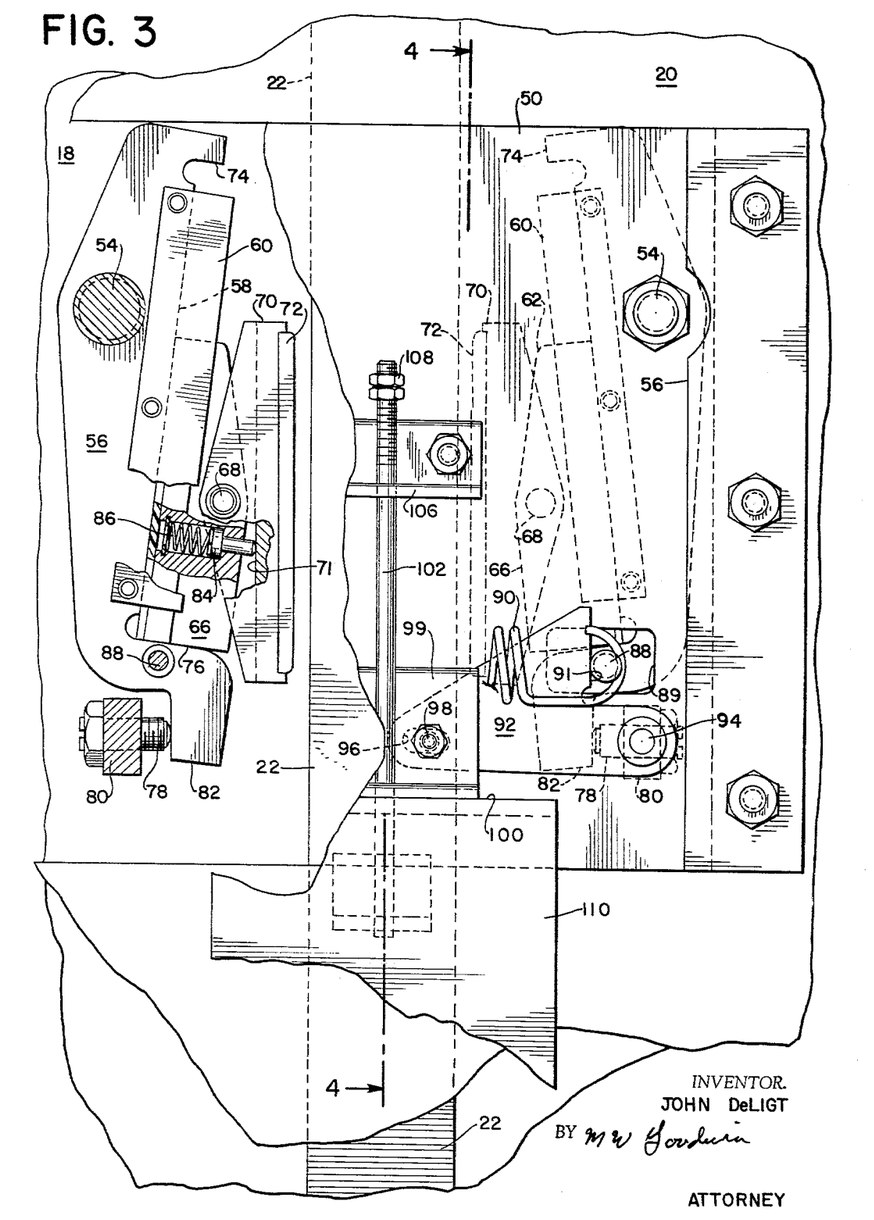
FIG. 3 is an enlarged front elevational view, partly in section, of a preferred embodiment of the safety brake of the present invention.
Figure 4:
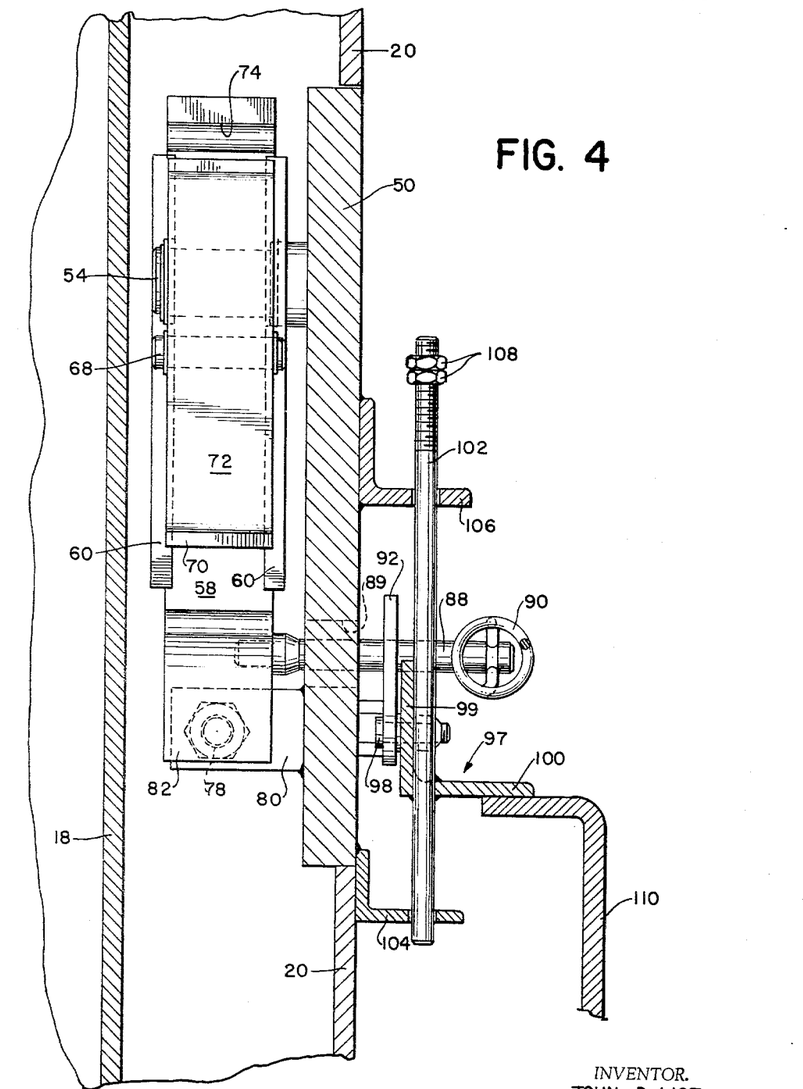
FIG. 4 is a cross-sectional view substantially along the line 4—4 of FIG. 3.
Figure 5:
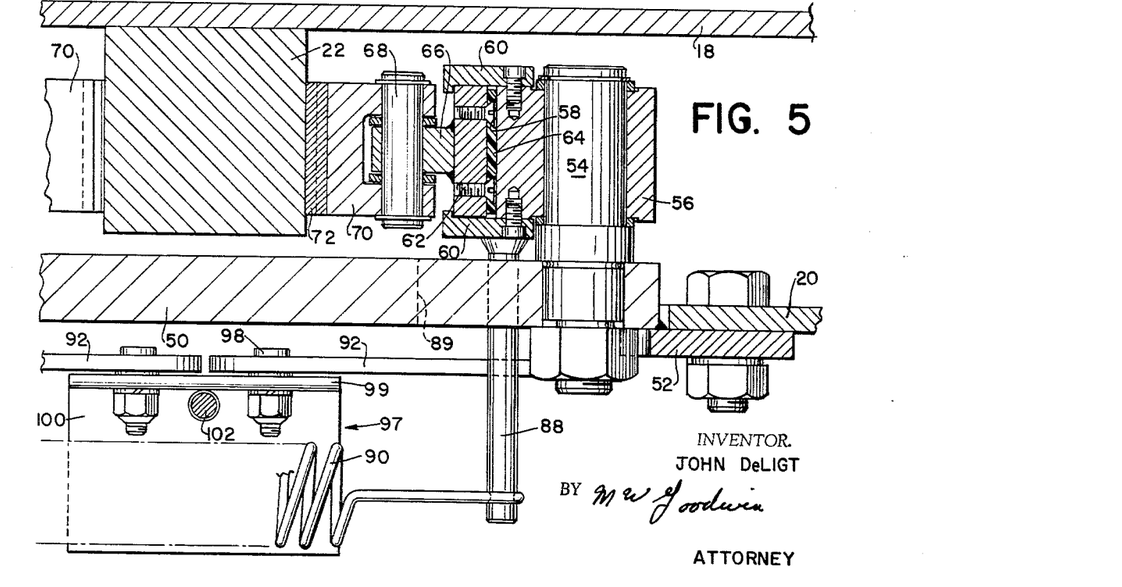
FIG. 5 is a cross-sectional view substantially along the line 5—5 of FIG. 6.

Turning now to FIGS. 3 to 6, a preferred embodiment of the brake means 44 of FIG. 1 is therein shown. With reference to FIGS. 3 to 5, the brake means comprises a mounting or base plate 50 suitably supported in fixed relation on the intermediate mast section 20 and in overlying spaced relation to the guide bar 22 on the fixed mast section. More specifically and as shown in FIG. 5, the intermediate mast section is provided with a cutout receiving the mounting plate. A pair of mounting blocks 52 are carried on the opposite sides and fixed relative to the mounting base and are bolted to the intermediate mast section 20. This means of mounting the base plate permits the brake assembly to be assembled on existing cranes as well as during initial construction and permits removal and reinstallation with accurate registry and location. While the brake means 44 has been shown as mounted on one side of the mast assembly, it will be understood that identical brake means may be mounted on the other side of the mast assembly. However, in the interests of brevity, only one such brake means is shown and will be described in detail, it being understood that the operation and structure of brake means on the opposite side of the mast assembly would be the same.

The mounting plate 50 carries a pair of pivot pins 54 on which are journalled a pair of brake arms 56. The levers of brake arms 56 are pivoted or journalled intermediate their ends and are disposed on opposite sides of the guide bar 22 of the fixed mast section, so as to be pivotable toward and away from the opposite sides of the guide bar 22, respectively. Each of the brake arms 56 has a surface 58 generally facing the respectively associated side surface of the guide bar 22 and carries a pair of guide members 60 which, as clearly shown in FIG. 5, cooperate with the surface 58 to provide a T-slot extending generally longitudinally of the brake arm. Slidably engaged with the T-slot is an elongated brake shoe slide 62 having a Teflon facing 64 secured thereto and in sliding engagement with the surface 58. Each slide 62 has an upstanding plate like member 66 extending towards the guide bar 22 and carrying a pivot pin 68 intermediate its ends. A generally channel shaped brake shoe 70 embraces the plate 66 and is pivotally mounted on the outer ends of each of the pins 68. Each shoe 70 is provided with brake lining 72 which is engageable with the next adjacent side of the guide bar 22.

The movement of each brake shoe slide 62, generally longitudinally of the brake arm 56, is limited by a shoulder 74 on one end of the associated brake arm and by a second shoulder 76 at the other end of the associated brake arm. Pivotable movement of each of the brake arms in a direction to move the brake shoes 70 away from the guide bar 22 is limited by a stop member 78 which is in the form of a threaded member carried by a block 80 fixed to the base member 50 of the brake assembly. Each stop or threaded member 78 is engageable with an ear or projection 82 at the extreme end of the associated brake arm 56 opposite the stop shoulder 74 thereof, or in terms of the specific embodiment shown, at the lower end of the brake arm.

As will be observed, in the condition of the brake means shown in FIG. 3, the brake shoes are spaced out of engagement with the guide bar 22. Each of the brake shoes is maintained with the brake lining 72 substantially parallel to the engageable surfaces of the guide bar by means of a spring pressed plunger 84 slidably received in a recess in the member 66 extending from the associated slide 62. The free end of the plunger 84 extends between the side walls of the generally channel shaped brake shoe 70 so as to engage the bottom 71 of the channel. In the release condition of the brake shown in FIG. 3, each of the plungers 84 is bottomed in the recess of the slide 62 with the biasing spring 86 holding it in that position. The projecting length of the plunger 84 is selected so that it will maintain the brake shoe in the desired parallel condition described.

Each of the brake arms 56 has a pin 88 extending at right angles thereto and disposed on the side of the pivot pin 54 opposite the upper end of the brake arm at which the stop shoulder 74 is located. Each of the pins 88 extends through an opening 89 in the mounting base with the outer ends of the pins terminating outwardly of the base plate on the opposite side thereof from the guide bar 22. A tension coil spring 90 is engaged with the outer ends of the pins 88 and tends to urge the brake arms 56 in the direction to move the brake shoes toward the guide bar 22 or into an engaged position or braking condition. Movement of each of the brake arms in this direction is limited by engagement of the pin 88 with a shoulder or cam surface 91 of a plate-like lever or cam 92 disposed on the side of the base plate 50 opposite the brake arms 56. The cams 92 are pivotally mounted on pivot pins 94 carried by the base plate and are further provided with elongated slots 96 extending generally radially of the pivot pins 94. Only one such cam is shown in FIG. 3, it being understood that an identical cam is associated with the other brake arm 56. Overlying the portions of the cams 92, provided with the slots 96, is an "L" shaped striker plate or actuating member 97.

Figure 6:
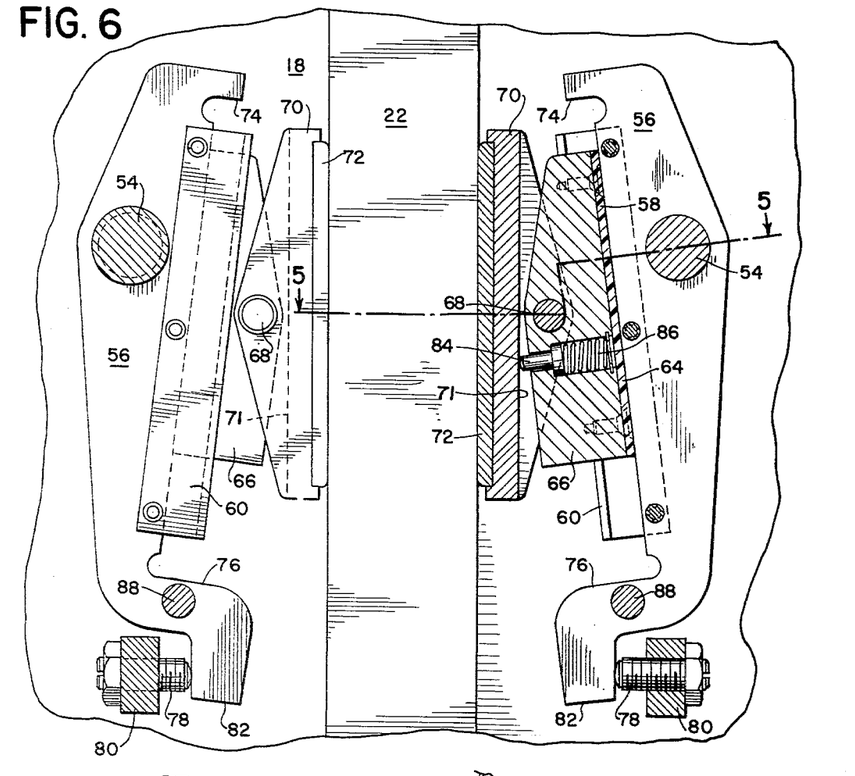
FIG. 6 is a view similar to FIG. 3 but with the elements of the brake in a different condition.

As clearly shown in FIGS. 4-6, a pin 98 extends through the slot 96 of each cam and through an opening in the overlying leg 99 of the striker plate 97. The end of the pin 98 opposite the striker plate is provided with a shoulder engaged with the inner side of the cam and the other terminal or outer end of the pin 98 is threadably engaged by a nut to retain the striker plate and cam plates in assembly. A washer is disposed intermediate the leg 99 of the striker plate and the cam plate to improve slidable engagement therebetween. The other leg 100 of this striker plate extends generally at right angles to the base plate and outwardly thereof. The leg 100 is provided with an opening in which is received a guide rod 102 extending generally parallel to the guide bar 22 on the fixed mast section. The guide rod 102 is fixed relative to the striker plate with its terminal ends being slidably received in openings in spaced-apart brackets 104, 106, fixed relative to the base plate 50. The upper end of the guide rod 102 is threaded and provided with stop nuts 108 engageable with the bracket 106 to limit downward movement of the striker plate.

In the released condition of the brake means, shown in FIGS. 3 and 4, the striker plate 97 is in its fully raised position and is held therein by engagement with a striker arm 110 carried by the fork assembly 28. In this position of the striker plate 97, the cams 92 will have been pivoted to the position shown in FIG. 3 wherein the cam surface 91 by engagement with the pins 88 on the brake arms 56, will move the brake arms against the force of spring 90 into the position shown in FIG. 3 wherein the brake shoes are spaced from the guide bar 22. On disengagement of the striker arm 110 and striker plate 97, the tension spring 90 will urge the pins 88 on the brake arms toward each other and thus by engagement of the pins 88 with the cam surfaces 91, pivot the cams 92 so that the slotted portions thereof tend to move downwardly, as viewed in FIG. 3. Correspondingly, the brake shoes will be moved toward the guide bar 22 on the fixed mast section. In the brake release position shown in FIG. 3, the brake shoe slides will be at the lowest end of the T-slots on the brake arms due to the effects of gravity. However, as soon as the brake shoes are moved sufficiently toward the guide bar to contact the brake lining 72 with the guide bar 22, and there is a tendency for relative movement between the brake means and the guide bar 22, with the brake means moving downwardly as viewed in FIG. 3, the resulting friction between the brake lining 72 and guide bar will cause the brake shoes to move upwardly relative to the brake arms 56. The brake arms and the braking components carried thereby are constructed and arranged so that when the brake lining initially engages the guide bar, the general plane of the bottom 58 of the T-slot on the brake arm will be at an angle to the longitudinal axis of the guide bar 22. More specifically, the general planes of the oppositely facing T-slots will converge toward each other in an upward direction, as viewed in FIG. 3, to provide a wedging action between the brake shoe and slide assembly and the guide bar 22 and which will effect relative movement between the brake shoe slide and its associated brake arm. The brake arm will then move downwardly, as viewed in FIGS. 3 and 4, relative to the brake shoe slide, forcing the brake arms to pivot outwardly in the direction restrained by the spring 90 until the brake arms are again in contact with the stop members 78. A further tendency of downward movement of the brake shoes relative to the guide bar 22 will cause firm wedging or cam engagement with the guide bar 22 to provide a firm locking or braking to prevent downward movement of brake means relative to the guide bar 22, as viewed in FIGS. 3 and 6.

In the operation of a crane incorporating the specific embodiment of the invention just described, and assuming that the fork is in its lowermost position or, in other words, spaced downwardly from the upper end of the intermediate mast section, the fork assembly is lifted until it engages the upper portion of the intermediate mast section 20 whereby continued lifting of the fork will effect lifting of the intermediate mast section. Prior to lifting engagement of the fork assembly with the intermediate mast, the striker arm 110 carried by the fork assembly will initially engage the striker plate 100 of the brake mechanism. Continued lifting of the fork assembly will thus effect pivoting of the cam plates 92 in a direction to move the pins 88 outwardly away from each other and thus move the brake shoes out of engagement with the intermediate mast 20. In other words, tion by the time the fork assembly is in lifting engagement with the intermediate mast 20. In other words, prior to engagement of the striker arm and striker plate, the brake elements will be in the position shown in FIGS. 5 and 6 in braking engagement with the guide bar 22. Subsequent to engagement of the striker plate and striker arm, the braking elements will be moved into the released position shown in FIG. 3 whereupon lifting of the intermediate mast section and cab by the fork assembly will not be impeded. Also, during the lifting engagement of the fork assembly with the intermediate mast section, and as will be seen in FIG. 1, a spring pressed plunger 112 carried on the upper end of the fork assembly will engage a stop or shoulder 114 on the intermediate mast section to move the plunger inwardly toward the fork assembly thus compressing the spring biasing the plunger. The spring of the plunger 112 is relatively stiff for a purpose which will be hereinafter apparent.

If when the fork assembly and intermediate mast section are in lifting engagement and the intermediate mast section is displaced vertically upwardly of the lower end portion of the fixed mast 18, the cable 34 or any other portion of the drive means for effecting lifting of the fork assembly should fail, thereby permitting the fork assembly to drop, the spring pressed pluger 112 will immediately effect vertical separation of the fork assembly from the intermediate mast section. This separation will attendantly effect separation of the striker arm 110 and striker plate 97. This separation will occur substantially simultaneously with dropping of the fork assembly or breaking of the cable whereupon the spring 90 of the braking means will urge the brake arms 56 in a direction to engage the brake shoes with the guide bar 22 to effect braking of the intermediate mast section in the manner heretofore described, and thus prevent the cab from falling along with the fork assembly. The operation of the brake mechanism heretofore described is purely mechanical and is not subject to failure of electronic components or the like. Also, the specific brake shoe utilized prevents gouging of the guide bar 22, while at the same time provides an effective means for attaining the primary object of the invention. It should also be apparent from the previously described operation of the braking means that when the brake shoes automatically engage the guide bar in the emergency situation just described, the braking force will be a gradually increasing one which will relieve much of the sudden impact on the crane elements, as well as the crane operator. As previously mentioned, the brake assembly of the embodiment just described may be completely assembled as a unit and installed on existing cranes, as well as on new units, with no difficulty. Further, the brake means has the advantage of requiring no adjustment after it is initially installed.

Figure 7:
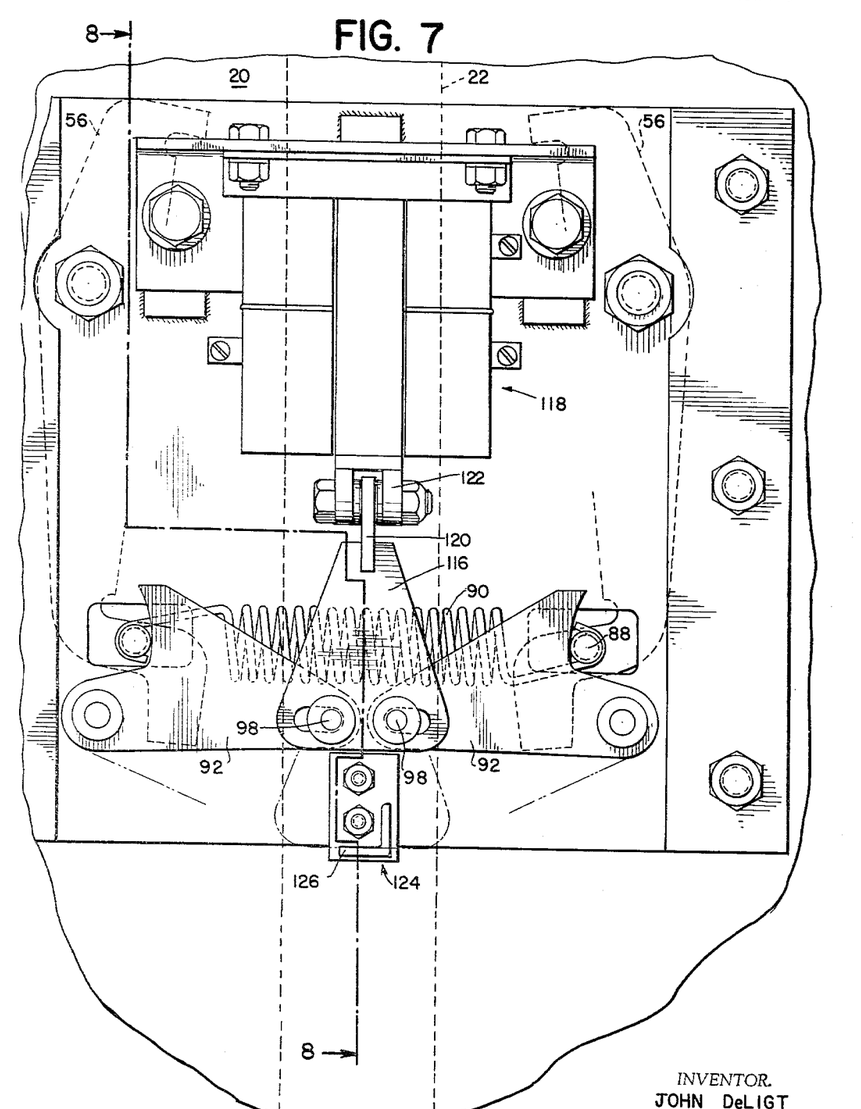
FIG. 7 is a front elevational view of an alternative embodiment of a safety brake of the present invention.
Figure 8:
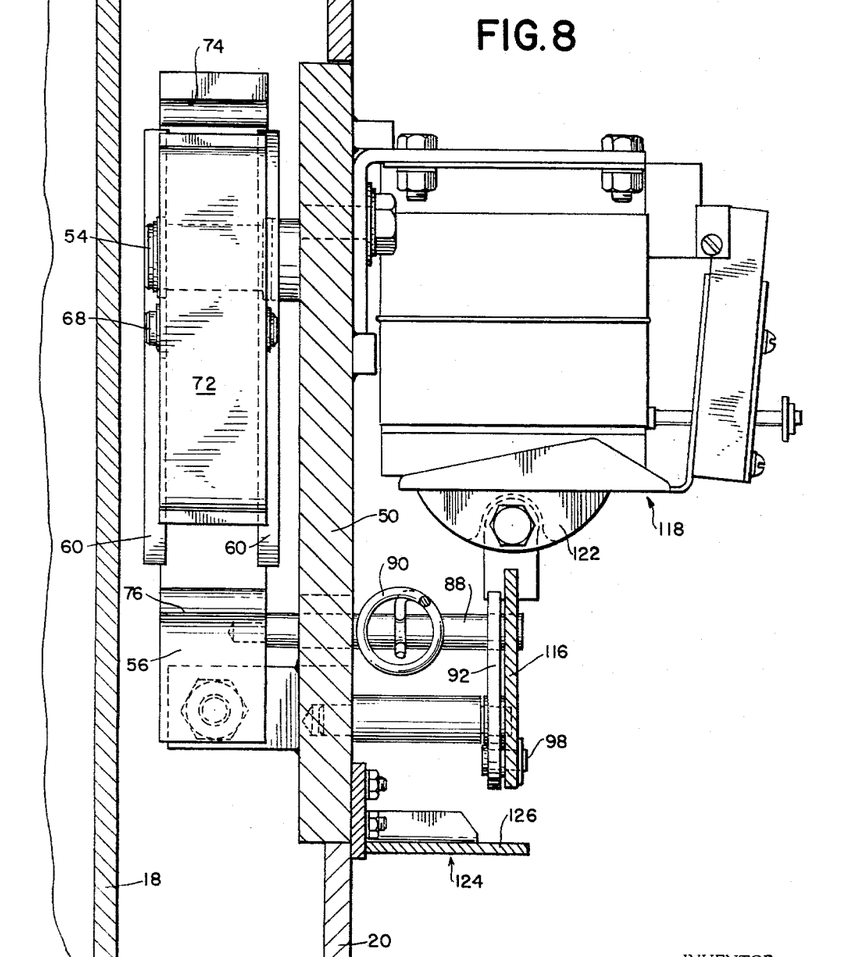
FIG. 8 is a cross-sectional view substantially along the line 8—8 of FIG. 7.
Figure 9:
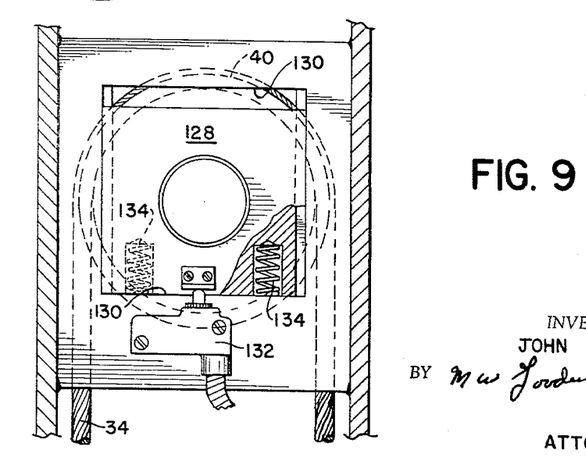
FIG. 9 is a fragmentary, enlarged end view of a portion of a crane such as shown in FIG. 1 illustrating a slack cable control device.

With reference to FIGS. 7 and 9, there is illustrated an alternative embodiment of the invention wherein actuation of the brake means is effected electrically rather than mechanically. More specifically and with reference to FIGS. 7 and 8, the braking elements of this embodiment are essentially the same in structure and function as those described in connection with the previously described embodiment, and thus will not again be described, with the exception that rather than having the cams 92 actuated by the striker plate, the cams are connected to a plate 116 which in turn is driven by solenoid 118. More specifically, the pins 98 extending through the elongated slots in the cams 92 are carried by the lower end of the plate 116. The upper end of the plate is connected to a link 120 which in turn is received within the bifurcated lower end portion of the armature 122 of the solenoid 118. The solenoid 118 is mounted on the base plate 50. A stop member 124 is mounted on the base plate 50 and disposed below the cams 92 to provide a stop surface 126 engageable by the cams 92 upon extension of the solenoid armature 122 to limit downward movement thereof.

When the solenoid 118 is energized, the armature 122 thereof is retracted within the solenoid to maintain the brake shoes out of engagement with the guide bar 22 of the fixed mast assembly or in the position shown in FIG. 3. However, if there is an interruption of current to the solenoid, the spring 90 will urge the brake arms 56 in a direction to effect engagement between the brake shoes and the guide bar and cause braking of the intermediate mast section and cab in the manner described in connection with the previously described embodiment. The de-energizing of the solenoid should be concurrent with a breaking of the cable or failure of any other portion of the drive means effecting lifting of the fork assembly. This de-energizing of the solenoid might be accomplished in a variety of ways. One of such ways is shown in FIG. 9 and is referred to as a slack cable device. In such a device, the sheave or pulley 40 on the bridge, for example, has its axle mounted in end plates 128 which are slidable vertically in an opening 130 in a wall or partition of the bridge assembly. When the cable is under load, such as during a lifting operation, the plates 128 will engage the lower bordering edge portion of the opening 130 and at least one will be in engagement with the plunger of a switch 132 which is connected in series with the solenoid 118. A plurality of springs 134 received in recess or openings in the plates 128 are compressed when the plate 128 is in its lowermost position shown in FIG. 9. Should the sheave become unloaded due to failure of the cable or other drive means effecting lifting of the fork assembly, the springs 134 will urge the plates 128 upwardly sufficiently to open the normally closed switch 132 and thus de-energize the solenoid 118 to effect the braking heretofore described.

It will thus be seen that there has been provided novel and improved means for effecting braking or halting of downward movement of an operator's cab assembly for a stacker crane in the event of failure of any portion of the lifting mechanism which would tend to result in a dropping of the cab. While the invention has been described in terms of a particular crane construction wherein the cab is mounted on an intermediate mast section, it will, of course, be apparent that the cab could be mounted on the fork assembly as well for vertical movement therewith, or that more than one intermediate mast section could be provided. Further, if desired, the cab could be controlled by the cable means or the like, separate from that for lifting the fork assembly. Additionally, while the alternative embodiment of FIGS. 7 and 9 has been described in terms of actuation of the solenoid by a slack cable device, it will, of course, be apparent to those skilled in the art that other means could be provided to de-energize the solenoid, such as a rate sensitive device or a switch assembly which would provide a closed circuit when the fork assembly and intermediate mast section of FIG. 1 were engaged in lifting position and an open circuit when these elements became disengaged in a manner such as heretofore described.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. In a stacker crane and the like, a first vertically extending mast section, a second vertically extending mast section movable vertically relative to said first section, a third mast section vertically extending and relatively movable relative to said first and second mast sections, an operator's cab mounted for movement with said second mast section, drive means for effecting vertical movement of said third mast section, said third and second mast sections being engageable over at least a portion of the movement of said third mast section to effect lifting of the second mast section relative to the first, brake means for locking said second mast section to said first mast section, said brake means being inoperative during normal lifting movement of said second mast section relative to said first mast section, means to render said brake means operative to lock said second mast section to said first mast section in response to separation of the second and third mast sections due to a failure of said drive means tending to cause said third mast section to fall, and means tending to separate said second and third mast sections in the event of such a failure.

2. In a stacker crane and the like having a first vertically extending mast section, a second vertically extending mast section vertically movable relative to said first mast section, and drive means for effecting movement of said second mast section vertically relatively to said first mast section; brake means to prevent relative vertical movement between said first and second mast sections in the event of a failure of said drive means which would otherwise cause said second mast section to fall, said brake means being carried by one mast section for movement therewith and comprising a pivoted lever and a brake shoe supported on said lever and engageable with a co-operating surface on the other mast section, said lever being pivoted intermediate its ends and having a slot inclined relative to said co-operating surface in all positions of the lever, a slide mounted in said slot and supporting said brake shoe; means for limiting pivotal movement of said lever in a direction tending to move the brake shoe out of engagement with said co-operating surface, means tending to maintain said lever in a pivoted position wherein said brake shoe is out of engagement with said co-operating surface during normal relative movement between said mast sections and responsive to a failure in said drive means which would cause dropping of said second mast section to permit engagement between said shoe and co-operating surface, thereby to effect a wedging action between said shoe and surface to hold the second mast section in its elevated position.

3. In a stacker crane as described in claim 2, said shoe being pivotally mounted on said slide, said slot in the lever being T-shaped and receiving said slide for movement longitudinally of the T-slot, means limiting movement of said slide in a downward direction in said T-slot when the shoe is out of engagement with said cooperating surface, a spring acting on said lever and tending to urge said lever in a direction to engage said shoe with said cooperating surface, cam means engageable with said lever and operative to pivot said lever in a direction to space said shoe from said cooperating surface during normal relative movement between said mast sections, and means controlling said cam means to effect pivoting of said lever in a direction to bring said shoe into engagement with said cooperating surface in response to a failure in said drive means which would cause said second mast section to fall.

4. In a stacker crane and the like, a first vertically extending mast section, a second vertically extending mast section vertically movable relative to said first mast section, drive means for effecting vertical movement of said second mast section relative to said first mast section, a guide bar on one of the mast sections extending longitudinally thereof and roller means on the other of said mast sections engageable with said bar for guiding of the movement of the other of said mast sections vertically relative to said one mast section, brake means to prevent relative vertical movement between said mast sections in the event of a failure of said drive means which would otherwise cause said second mast section to drop, said brake means being carried by said other mast section for movement therewith and comprising a pair of brake shoes engageable with opposite sides of said guide bar, a lever associated with each shoe and pivoted intermediate its ends, a slide carried by said lever for movement generally longitudinally of the lever, means on the lever for limiting movement of the slide in either direction longitudinally of the lever, means pivotally mounting the brake shoes on the slides, stop means limiting movement of each lever in a direction to move the associated brake shoe away from the guide bar, resilient means urging each lever in a direction to move the brake shoes into engagement with the guide bar, the slides mounting the brake shoes having directions of movement relative to the supporting levels which are at all times converging toward the guide bar, whereby contact of the brake shoes with the guide bar together with a tendency of relative movement between the guide bar and brake shoes will tend to effect movement of the slides along said supporting levers with attendant pivoting of the levers until the same engage said stop means, where upon tendency of continued relative movement between the guide bar and brake shoes will effect a firm wedging engagement there between, and means for actuating said support means to space said brake shoes out of engagement with the sides of said guide bar during normal relative vertical movement between said mast sections and for effecting engagement of said shoes and guide bar in response to a failure in said drive means which would cause said second mast section to fall.

5. In a stacker crane as described in claim 4, a pair of pivotally mounted cams each having a shoulder engageable respectively with means on one of said levers to move the lever in a direction to move the brake shoes away from said guide bar in response to pivoting of the cams in one direction corresponding to a direction opposite the direction of movement of the levers under the effect of said resilient means, said resilient means comprising a tension spring connected at its opposite ends to said levers, means for maintaining said cams in a pivoted position corresponding to spacing of said brake shoes from said guide bar during normal relative movement of said mast sections, and means for releasing said cams to permit said spring to urge said levers in a direction to effect engagement of said brake shoes with the opposite sides of said guide bar.

6. In a stacker crane as described in claim 5, said cam plates being pivotally connected to a striker plate supported on said second mast section for movement generally longitudinally of said guide bar, a third mast section guided for movement vertically relative to said second mast section, and cooperating means movable with said third mast section engageable with said striker plate to move the same in a direction to effect movement of said cam plates to move said levers in a brake shoe disengaging direction, said drive means being connected to said third mast section, said striker plate and cooperating means being engageable to effect the cam plate movement described during normal vertical relative movement of said mast sections and being separable in response to downward movement of said third mast section relative to said second mast section.

7. In a stacker crane as described in claim 6, means acting between said second and third mast sections to forcibly effect separation of said striker plate and cooperating means in response to a failure in said drive means which would cause dropping of said third mast section.

8. In a stacker crane as described in claim 6, a solenoid drivingly connected to said cams to effect movement of the same in a direction to move said levers in a brake shoe disengaging direction in response to energizing of the solenoid, and means to effect de-energizing of the solenoid in response to a failure of said drive means which would cause said second mast section to fall.

9. In a stacker crane and the like, a first vertically extending mast section, a second vertically extending mast section movable vertically relative to said first mast section, a guide bar extending longitudinally of one of said mast sections, a plurality of rollers on the other of said mast sections engaged with said guide bar for guiding of the other mast section telescopically relative to said one mast section, drive means connected to said second mast section for effecting movement of the same vertically relative to said first mast section, a base mounted on said other mast section for movement therewith and overlying said guide bar, a pair of pivoted levers pivotally mounted on said base intermediate their ends, each of said levers slidably mounting a slide member for movement longitudinally of the lever, means at the opposite ends of each lever engageable with said slide member to limit movement thereof, a brake shoe pivotally mounted on each of said slide members with the brake shoes being disposed on opposite sides of said guide bar for engagement with the opposite side surfaces thereof, a tension spring connected between said levers and urging the same in a direction to engage said brake shoes with the opposite sides of the guide bar, the slides having directions of movement which are at all times converging upwardly toward said guide bar, a pair of cams pivotally mounted on said mounting base and having means engageable with means on said levers whereby simultaneous pivoting of said cam plates in corresponding directions will effect pivoting of said levers in a direction corresponding to movement of the brake shoes away from said guide bar, said mounting base being removably mounted on the mast section with which it is movable, a fork assembly movable vertically relative to said second mast section, drive means for effecting vertical movement of said fork assembly, means on the fork assembly engageable with means on second mast section to effect lifting of the second mast section relative to said first mast section over at least a portion of the travel of the fork assembly, cooperating means on said brake means and for assembly for effecting movement of said cam plates in a direction to effect disengagement of the brake shoes and guide bar when the fork assembly and second mast section are in lifting engagement, and means for forcibly effecting separation of said fork assembly and second mast section so as to release said cam plates and permit engagement of said brake shoes with the guide bar in response to a failure of said drive means which would cause said fork assembly to tend to fall.

10. In a stacker crane and the like, a first vertically extending mast section, a second vertically extending mast section movable vertically relative to said first mast section, a guide bar on one of said mast sections extending longitudinally thereof, a plurality of rollers on the other mast section engageable with said guide bar, an operator's cab mounted for movement with said second mast section, drive means for effecting movement of said second mast section vertically relative to said first mast section, brake means for locking said second mast section to said first mast section to prevent falling of the second mast section in the event of a failure of said drive means which would cause falling of said second mast section, said brake means being supported by said other mast section and comprising a pair of levers pivotally mounted intermediate their ends and disposed on opposite sides of said guide bar, means providing each of said levers with a guide slot extending angularly upwardly and toward said guide bar, a slide mounted in the guide slot of each guide bar for movement generally longitudinally of the lever, means on each lever limiting sliding movement of the slide in opposite directions longitudinally of the lever, a brake shoe pivotally mounted intermediate its ends on each of the slides and having a surface engageable with the next adjacent surface of the guide bar, a spring pressed plunger carried by each slide and engageable with the respectively associated brake shoe and tending to maintain the brake shoe generally parallel to the guide bar, adjustable means limiting movement of each lever in a direction to move the brake shoe away from the guide bar, a pair of upstanding pins respectively mounted on the levers, a tension spring connected at opposite ends to said pins urging the levers in a direction to engage the brake shoes with the opposite sides of the guide bar, a pair of pivotally mounted cams engageable with said levers respectively to move the same against the force of said spring and in a direction to space said brake shoes from the guide bar, means to maintain said cam plates in a pivoted position corresponding to spacing of said brake shoes from the guide bar and to release said cam plates to permit said spring to urge said levers in a brake shoe engaging direction in response to a failure of said drive means which would cause said second mast section to fall.

References Cited by the Examiner

UNITED STATES PATENTS

| 2,403,333 | 7/1946 | Bjerke | 187—82 |
| 2,717,663 | 9/1955 | Higgins | 188—67 X |
| 2,889,014 | 6/1959 | Goetz | 188—171 |
| 2,925,151 | 2/1960 | Chandler | 187—85 |
| 3,061,111 | 10/1962 | Riemenschneider | 212—21 |
| 3,144,137 | 8/1964 | Valliere et al. | 212—128 |

SAMUEL F. COLEMAN, *Primary Examiner*.